United States Patent
Litenas et al.

[11] Patent Number: 5,468,916
[45] Date of Patent: Nov. 21, 1995

[54] MEANS FOR FIXING WINDING OVERHANGS IN ELECTRICAL MACHINES

[75] Inventors: Michael Litenas, Laufenburg, Germany; Roland Schuler, Wettingen, Switzerland

[73] Assignee: Asea Brown Boveri Ltd., Baden, Switzerland

[21] Appl. No.: 54,236

[22] Filed: Apr. 30, 1993

[30] Foreign Application Priority Data

Jun. 10, 1992 [DE] Germany ............... 42 18 969.1

[51] Int. Cl.⁶ .................................................. H01B 5/16
[52] U.S. Cl. ................ 174/127; 174/113 C; 174/119 C; 174/131 A
[58] Field of Search .............. 174/127, 69, 113 C, 174/119 C, 131 A; 29/596; 310/42

[56] References Cited

U.S. PATENT DOCUMENTS

| | | | |
|---|---|---|---|
| Re. 29,133 | 2/1977 | Snellman et al. | 57/140 G |
| 3,662,533 | 5/1972 | Snellman et al. | 57/140 G |
| 3,824,940 | 7/1974 | Habegger et al. | 29/596 |
| 3,844,235 | 10/1974 | Habegger | 29/596 |
| 3,862,493 | 1/1975 | Habegger et al. | 29/596 |
| 3,980,808 | 9/1976 | Kikuchi et al. | 174/110 SR |
| 4,528,223 | 7/1985 | Kumazawa et al. | 428/36 |
| 4,614,161 | 9/1986 | Frederick | 29/596 |

FOREIGN PATENT DOCUMENTS

| | | |
|---|---|---|
| 571774 | 3/1933 | Germany. |
| 425983 | 6/1967 | Germany. |
| 1265279 | 4/1968 | Germany. |
| 1488429 | 3/1969 | Germany. |

OTHER PUBLICATIONS

Sequenz, H.: Herstellung der Wichlungen Electrischer Maschinen Springer Verlag, Wien, New York, 1973, pp. 119, 120, 131–134, 160, 161.

*Primary Examiner*—Morris H. Nimmo
*Attorney, Agent, or Firm*—Oblon, Spivak, McClelland, Maier, & Neustadt

[57] ABSTRACT

To fix the conductors and coils of wind overhangs and to fill cavities in the winding overhangs of electrical machines, strings are used which include compressible rovings (1) made up of fibers and surrounded by an elastic sheath (2) which is permeable to impregnating resin. A spacing is introduced into the winding overhangs with a thickness which is greater than the spacings to be filled. The strings are impregnated after they are pulled in. To improve the overhang corona shielding, the strings are treated with a conductive impregnating agent which is permeable to the impregnating resin before they are pulled in.

4 Claims, 1 Drawing Sheet

MEANS FOR FIXING WINDING OVERHANGS IN ELECTRICAL MACHINES

BACKGROUND OF THE INVENTION

Field of the Invention

The invention relates to a method of fixing the conductors and coils of winding overhangs and of filling cavities in the winding overhangs of electrical machines by pulling in strings which comprise compressible rovings made up of fibers and surrounded by an elastic sheath which is permeable to impregnating resin, the spacing means being introduced into the winding overhangs with a thickness greater than the spacings to be filled and the strings being impregnated after being pulled in.

The invention furthermore relates to a string for carrying out the method.

Discussion of Background

In rotating electrical machines, in particular in fairly large motors and generators, the conductors and coils of exposed winding sections, referred to here collectively as winding overhangs, are spaced and mutually supported. In the method disclosed in German Patent Specification DE-PS 14 88 429 of fixing the conductors and coils of winding overhangs and of filling cavities in the winding overhangs of electrical machines, impregnatable strings are used. These strings have a core composed of fibers in the form of a compressible roving surrounded by an elastic sheath. The spacing means is introduced into the winding overhangs with a thickness which is larger than the spacings to be filled. In this method, the strings are impregnated only after they have been pulled in.

The conductors and coils in the winding overhang of such electrical machines are, without exception, provided with a corona shielding, the overhang corona shielding. If the strings are now pulled in in the state described, despite the elasticity inherent in the strings, regions may be produced in which the strings are not fully in contact with the conductors and coils. Although this does not result primarily in a mechanical weakening of the winding overhang composite, partial discharges which in time result in a local destruction of the organic insulating components may occur in these regions.

SUMMARY OF THE INVENTION

Accordingly, one object of the invention is to provide a novel method of fixing the coils and conductors in the winding overhang and of filling cavities in the winding overhang of electrical machines, which method meets all the operating requirements not only in regard to the necessary mechanical robustness but also in regard to the corona shielding and is also simple to apply. A further object of the invention is to provide a string for carrying out said method.

The first object is achieved, according to the invention, by a method which comprises treating the strings with a conductive impregnating agent which is permeable to the impregnating resin before they are pulled in.

A string which is particularly suitable for carrying out the method has a core of fibers which mostly extend in the longitudinal direction of the string and which are combined to form a roving, which roving is elastic in the direction transverse to the longitudinal direction and is surrounded by an elastic sheath which is permeable to impregnating resin, and the sheath is impregnated, at least in the region near the surface, with a conductive impregnating agent which is inert towards the impregnating resin.

A winding overhang support produced by the method according to the invention is notable for outstanding mechanical strength. In addition, as a consequence of their surface or surface layer which is conductive even after impregnation and curing of the impregnating resin, the strings are completely integrated in the overhang corona shielding. Even if the strings are not mechanically in contact with the winding at every point, no corona discharges can take place in the intervening gas spaces.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein a diagrammatic representation of an exemplary embodiment of a string according to the invention is shown.

DESCRIPTION OF THE PREFERRED EMBODIMENTS

Figure 1:
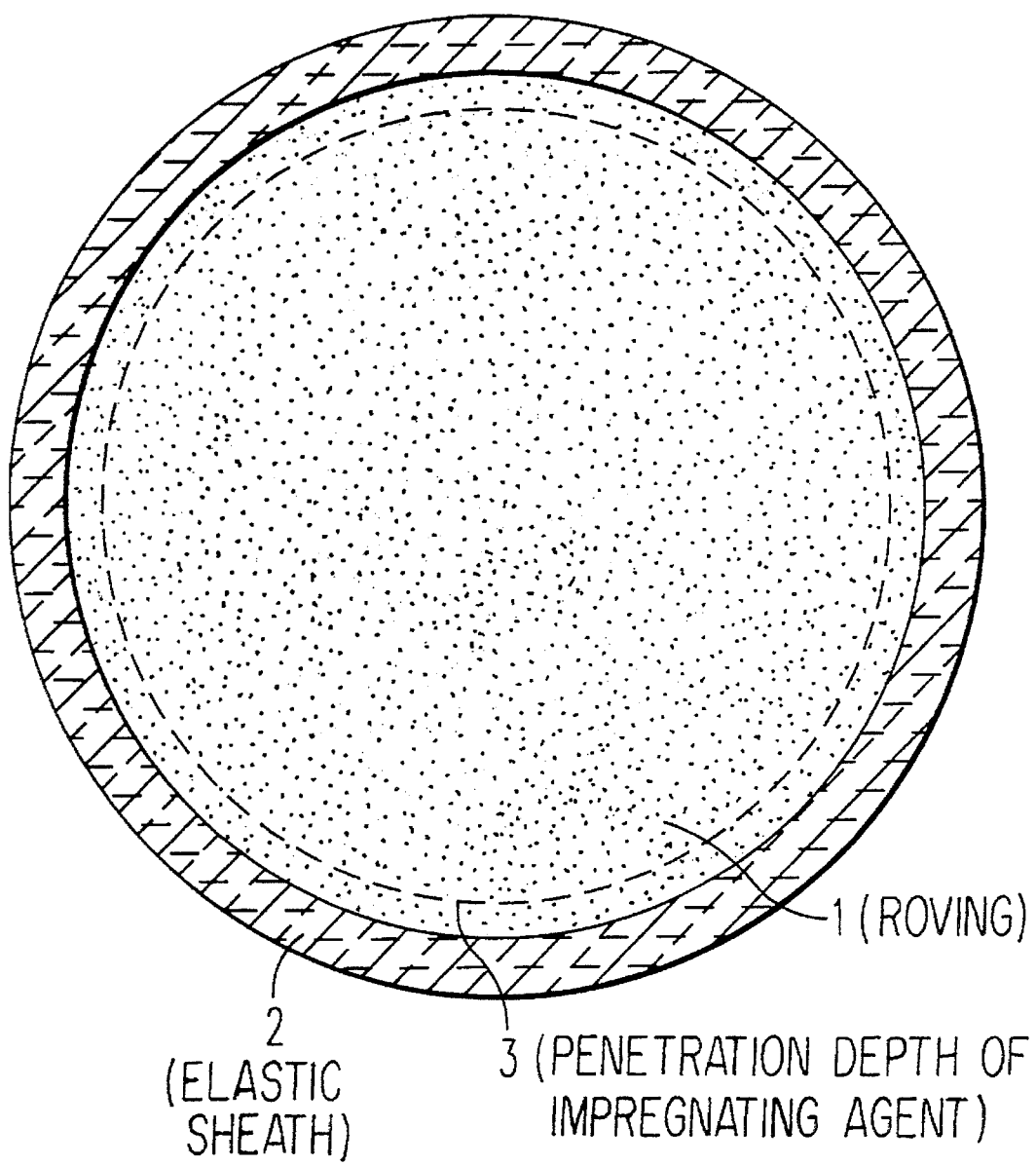

Referring now to the drawing, the string shown in cross section in the sole FIGURE has a core 1 composed of fibers, preferably glass fibers, which mostly extend in the longitudinal direction of the string. These are combined to form a sort of elastic roving and are surrounded by an equally elastic sheath made of insulating material, preferably glass fibers, 2. This sheath is permeable to impregnating resin. The same applies to the roving, the fibers, which mostly extend in the longitudinal direction of the string, ensuring, as a consequence of their capillary action, that the impregnating resin spreads well in the longitudinal direction of the string and is consequently also able to reach the points in the roving which are not directly accessible.

Strings of the type described are prior art. Their detailed construction and their use in electrical machine construction are described in the relevant literature, for example at the point cited in the book by Sequenz mentioned at the outset.

In order also to improve a winding overhang support comprising such impregnated strings in relation to corona shielding, the string is treated at the surface with a conductive impregnating agent before its incorporation. For this purpose, the string is passed through a bath containing an impregnating agent. Said impregnating agent is preferably composed of a water-soluble binder to which conducting pigments, for example silicon carbide powder, have been added. In this process, the dwell time in the bath is chosen in such a way that an impregnation of the string occurs essentially only in the surface region of the sheath 2, at most, however, in that region of the roving 1 adjacent thereto—as clearly shown by the broken circle 3 in the FIGURE.

At the same time, the binder is chosen in such a way that, after setting, it is inert towards the impregnating resin; that is to say it cannot be attacked or even dissolved by the impregnating resin.

On leaving the bath, excess impregnating agent is skimmed off, for example by passing the string through a bore having a smaller diameter than the outside diameter of the string. Because the string again assumes its original diameter after passing through the bore as a result of its elasticity, virtually no conglutinations, which prevent or impede the subsequent penetration of the impregnating resin, occur in the sheath: the string is therefore still permeable to the impregnating resin.

After the binder has set, the string is ready for incorporation in the machine and can be processed in a known manner.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A string comprising:

a core of fibers extending substantially in a longitudinal direction of said string, said fibers forming a roving which is elastic in a direction perpendicular to said longitudinal direction; and an elastic sheath surrounding said roving, wherein said elastic sheath is impregnated, at least in a region near an outer surface thereof, with a conductive impregnating agent which is inert toward an impregnating resin which is subsequently applied to said string.

2. A string according to claim 1, wherein said impregnating agent is a binder to which fillers are added.

3. A string according to claim 2, wherein said fillers are conducting pigments.

4. A string according to claim 2, wherein said binder is water-soluble.

* * * * *